United States Patent
Muraoka et al.

(10) Patent No.: US 8,869,771 B2
(45) Date of Patent: Oct. 28, 2014

(54) COMBUSTION CHAMBER CONSTRUCTION FOR ENGINE

(75) Inventors: Tomoyuki Muraoka, Anjo (JP); Shinichi Murata, Okazaki (JP); Shinji Matsumura, Otsu (JP)

(73) Assignees: Mitsubishi Jidosha Kogyo Kabushiki Kaisha, Tokyo (JP); Mitsubishi Jidosha Engineering Kabushiki Kaisha, Okazaki-Shi (JP)

( * ) Notice: Subject to any disclaimer, the term of this patent is extended or adjusted under 35 U.S.C. 154(b) by 692 days.

(21) Appl. No.: 13/214,486

(22) Filed: Aug. 22, 2011

(65) Prior Publication Data

US 2012/0042858 A1 Feb. 23, 2012

(30) Foreign Application Priority Data

Aug. 23, 2010 (JP) ................................ P2010-186571

(51) Int. Cl.
*F02B 23/00* (2006.01)
*F02B 23/08* (2006.01)
*F02B 31/00* (2006.01)

(52) U.S. Cl.
CPC .............. *F02B 23/08* (2013.01); *Y02T 10/146* (2013.01); *Y02T 10/125* (2013.01); *F02B 31/00* (2013.01)
USPC ........................................ 123/308; 123/657

(58) Field of Classification Search
USPC .................................. 123/308, 306, 657, 661
See application file for complete search history.

(56) References Cited

U.S. PATENT DOCUMENTS

| 4,538,566 | A | * | 9/1985 | Tsuruoka ....................... 123/276 |
| 5,720,253 | A | * | 2/1998 | Matoba et al. ................. 123/298 |
| 6,874,489 | B2 | * | 4/2005 | Yonekawa et al. ............. 123/657 |
| 7,357,117 | B2 | | 4/2008 | Yoshikawa |
| 7,395,806 | B2 | * | 7/2008 | Ballauf et al. ................ 123/263 |

FOREIGN PATENT DOCUMENTS

| JP | 2006-329131 A | 12/2006 |
| JP | 2008-274788 A | 11/2008 |

* cited by examiner

*Primary Examiner* — Hieu T Vo
(74) *Attorney, Agent, or Firm* — Birch, Stewart, Kolasch & Birch, LLP

(57) ABSTRACT

A combustion chamber construction includes inlet and exhaust side sloping surfaces. The inlet side sloping surface is formed on one side of a pentroof apex portion as a boundary and which has an inlet port. The exhaust side sloping surface is formed on the other side of the pentroof apex portion as the boundary and which has an exhaust port. A flow improving portion is formed between the inlet port and exhaust port. The flow improving portion includes an inlet flow surface which is formed by recessing part of the inlet side sloping surface and an exhaust side guide surface. One end of the exhaust side guide surface is connected to an exhaust surface of the exhaust side sloping surface and the other end is connected to the inlet flow surface. An angle formed by the inlet flow surface and the exhaust side guide surface is smaller than or equal to an angle formed by the exhaust surface and the exhaust side guide surface.

8 Claims, 8 Drawing Sheets

COMBUSTION CHAMBER CONSTRUCTION FOR ENGINE

BACKGROUND

The present invention relates to a combustion chamber construction for an engine which is applied to a combustion chamber in a cylinder head of a gasoline engine or the like.

Inlet ports and exhaust ports are formed in a cylinder head of an engine such as a gasoline engine, and the ports are designed so as to be opened and closed by inlet valves and exhaust valves at predetermined timings. In addition, there is known an engine which includes a variable valve lift mechanism which can change opening degrees or lift amounts of inlet valves in accordance with the operating conditions of the engine.

In the engine including the variable valve lift mechanism, an improvement in exhaust emissions or an increase in fuel consumption is realized by decreasing the lift amounts of the inlet valves and producing a tumble flow of inlet air/fuel mixture in the combustion chambers when the engine load is small, for example. Because of this, it is an important subject to realize the generation of a stable tumble flow and a strong flow of inlet air/fuel mixture when the lift amounts are small. The tumble flow means among air or air/fuel mixture flows generated in the combustion chamber an air or air/fuel mixture flow which is a swirl having a spiraling center in a direction which intersects a reciprocating direction of a piston at right angles and which is also called a vertical swirl.

In order to generate a desirable tumble flow in a combustion chamber, for example, Patent Document 1 discloses a proposal in which a flow promoting portion called a shroud is formed at part of the combustion chamber in a side lying farther from an exhaust port, so as to promote the generation of a tumble flow. In addition, Patent Document 2 discloses a proposal in which the flow of inlet air/furl mixture is promoted by forming a guide portion made up of a recess portion on an opposite side to the shroud in a side lying nearer to the exhaust port.

[Patent Document 1] Japanese Patent Publication No. 2006-329131 A

[Patent Document 2] Japanese Patent Publication No. 2008-274788 A

SUMMARY

FIG. 11 shows an example of a conventional pentroof type combustion chamber 100 having the guide portion. This combustion chamber 100 has an inlet side sloping surface 101 on one side a pentroof apex portion $A_0$ as a boundary and an exhaust side sloping surface 102 on the other side thereof. An inlet port 110 is formed in the inlet side sloping surface 101, and an exhaust port 111 is formed in the exhaust side sloping surface 102. Further, in order to improve the flow of inlet air/fuel mixture, a guide portion 112 is formed in proximity to the inlet port 110. The guide portion 112 is formed by machining part of the inlet side sloping surface 101. In the event that the shape and position of the guide portion 112 are highly accurate, an inlet air/fuel mixture flowing into the combustion chamber 100 from the inlet port 110 flows along the guide portion 112 and an exhaust surface 121 as indicated by an arrow Q1, and a tumble flow is generated.

However, with a cylinder head made of castings, it is inevitable because of the limit in production accuracy that the height of a surface of a material of the combustion chamber deviates. For example, in FIG. 11, there occurs a situation in which the height of a material surface 120 deviates towards an upper side as indicated by a line L1 or deviates towards a lower side as indicated by a line L2. When the height of the material surface 120 deviates towards the lower side as indicated by the line L2, a distance from an inlet end to an outlet end of the guide portion 112 is increased, and the position and orientation of the outlet end of the guide portion 112 changes with respect to the exhaust surface 121.

As a result, when a lift amount of an inlet valve 130 is small, the direction in which the inlet air/fuel mixture flow changes as indicated by an arrow Q2, which causes a situation in which a desired tumble flow cannot be generated or a strong tumble flow cannot be realized. Conventionally, since stable combustion cannot be attained due to the situation so caused, a countermeasure such that a larger inlet amount is set so as to stabilize combustion at the sacrifice of better fuel consumption has been studied.

It is therefore one advantageous aspect of the present invention to provide a combustion chamber construction for an engine which can improve the flow of inlet air/fuel mixture which flows into a combustion chamber from an inlet port.

According to one aspect of the invention, there is provided a combustion chamber construction for an engine, the construction comprising:

an inlet side sloping surface which is formed on one side of a pentroof apex portion as a boundary and which has an inlet port;

an exhaust side sloping surface which is formed on the other side of the pentroof apex portion as the boundary and which has an exhaust port; and a flow improving portion, formed between the inlet port and exhaust port, and including:

an inlet flow surface which is formed by recessing part of the inlet side sloping surface; and an exhaust side guide surface, one end of which is connected to an exhaust surface of the exhaust side sloping surface and the other end of which is connected to the inlet flow surface, wherein an angle formed by the inlet flow surface and the exhaust side guide surface is smaller than an angle formed by the exhaust surface and the exhaust side guide surface.

The angle formed by the inlet flow surface and the exhaust side guide surface may be constant along an apex portion of the flow improving portion.

A pair of inlet ports may be formed in the inlet side sloping surface, and the apex portion of the flow improving portion and the exhaust side guide surface may extend along a direction in which the pair of the inlet ports are aligned.

A shape of the exhaust side guide surface may have a straight-line portion which extends along the direction in which the pair of the inlet ports are aligned and arc portions which are formed at both ends of the straight-line portion.

The combustion chamber construction may further comprise: a shroud portion, formed on a side which lies farther from the exhaust port than the inlet flow surface of the inlet side sloping surface, and projected to an inside of the combustion chamber; and a stepped portion formed between the shroud portion and the inlet flow surface.

An angle between the stepped portion and the inlet flow surface may be equal to an angle between the inlet flow surface and the exhaust side guide surface.

The stepped portion may be formed on a straight line which connects centers of the pair of the inlet ports.

DETAILED DESCRIPTION OF EXEMPLIFIED EMBODIMENTS

Hereinafter, a combustion chamber construction for an engine according to an embodiment of the invention will be described by reference to FIGS. 1 to 7.

Figure 1:
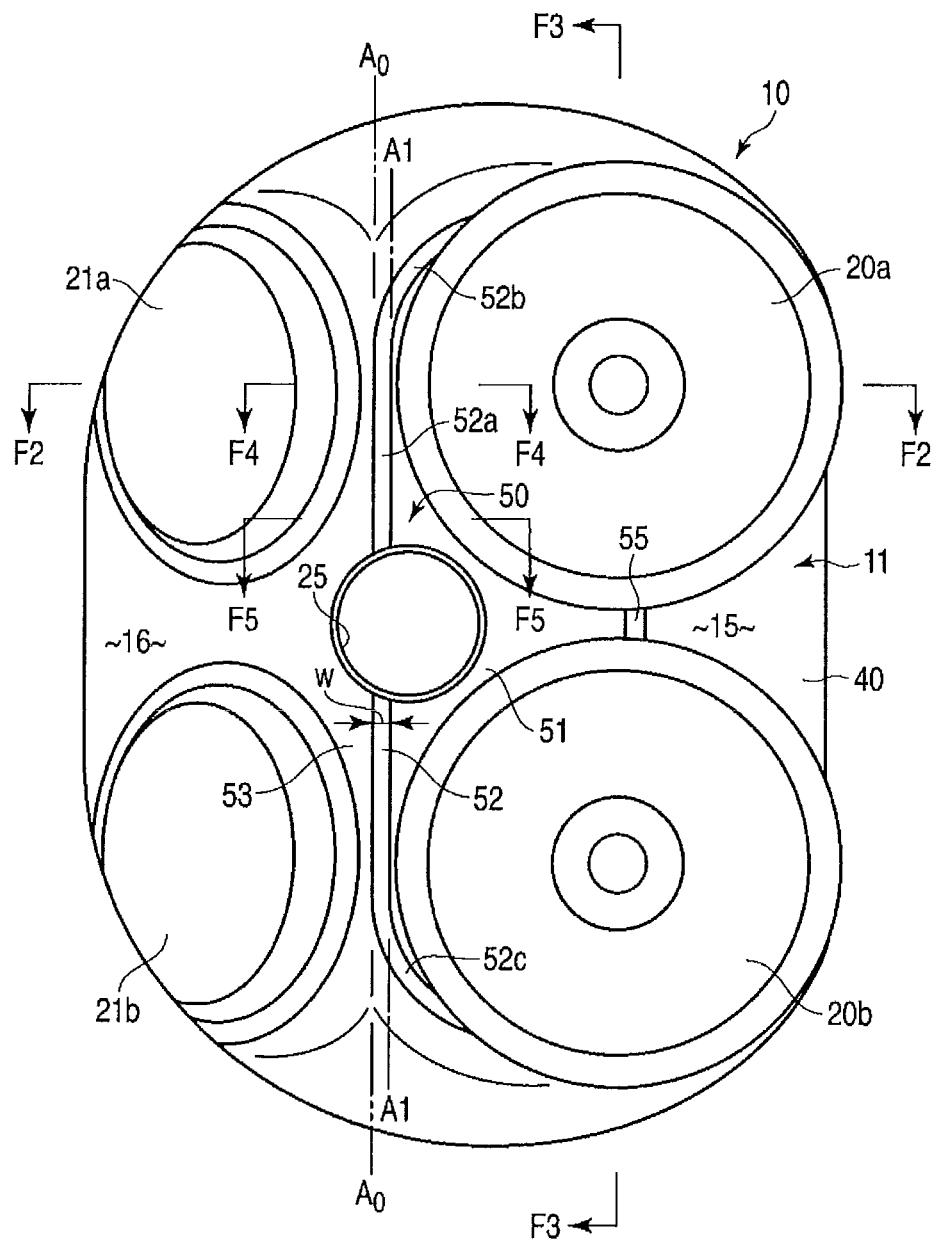
FIG. 1 is a perspective view of a combustion chamber, as viewed from an inside thereof, according to one embodiment of the invention.
Figure 2:
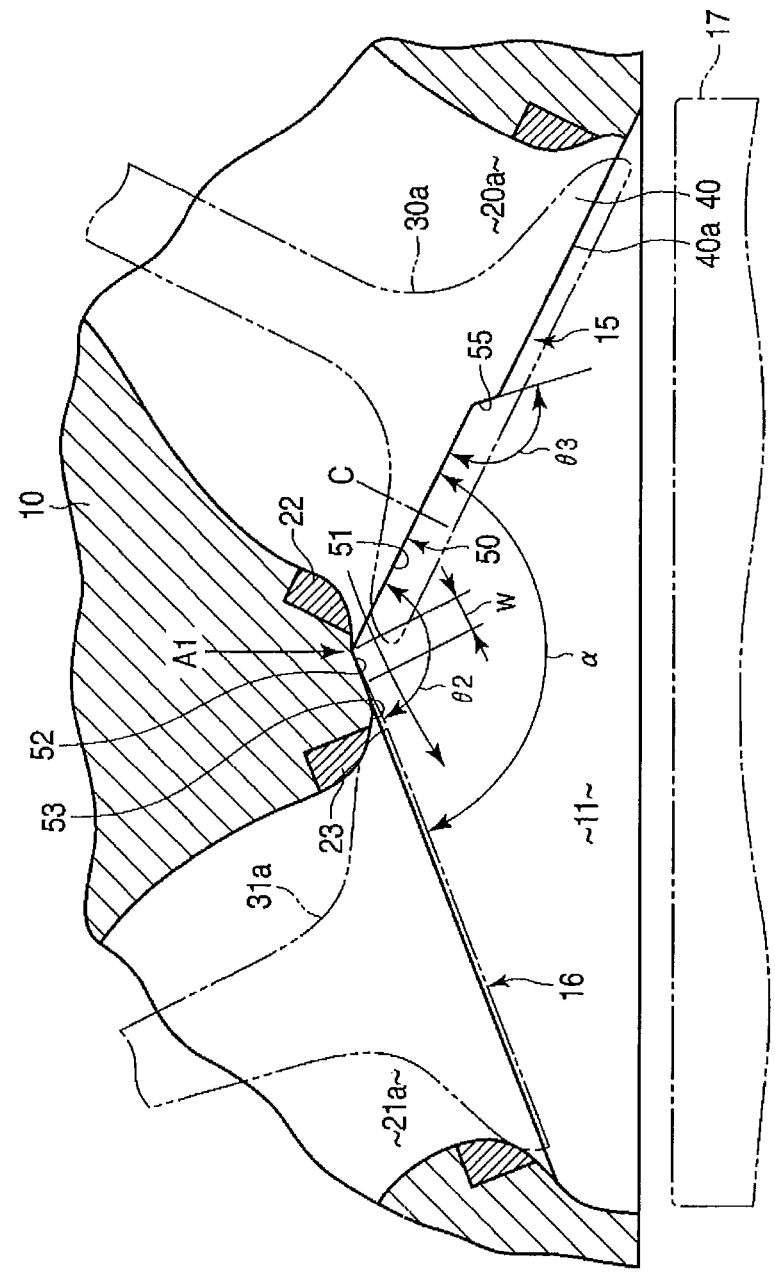
FIG. 2 is a sectional view of the combustion chamber taken along the line F2-F2 in FIG. 1.

FIG. 1 is a perspective view of a pentroof type combustion chamber 11 formed in a cylinder head 10 of an engine, as viewed from an inside thereof. FIG. 2 is shows a section of part of the combustion chamber 11 which is taken along the F2-F2 line in FIG. 1. The cylinder head 10 is fixed to a cylinder block (not shown) of the engine. The cylinder head 10 is a cast product of a metal such as an aluminum alloy.

The pentroof type combustion chamber 11 (hereinafter, a combustion chamber 11) has an inlet side sloping surface 15 formed on one side of a pentroof apex portion $A_0$ which is a right-hand side in FIGS. 1 and 2 as a boundary and an exhaust side sloping surface 16 on the other side thereof which is a left-hand side in FIGS. 1 and 2. The pentroof apex portion $A_0$ extends in a radial direction of the combustion chamber 11, which is also a radial direction of a piston 17, like a ridge. In other words, a portion where the inlet side sloping surface 15 and the exhaust side sloping surface 16 intersect each other constitutes the pentroof apex portion $A_0$. As is shown in FIG. 2, an angle α formed by the inlet side sloping surface 15 and the exhaust side sloping surface 16 is 90 degrees or more, for example, in the range from 120 degrees to 150 degrees.

A pair of inlet ports 20a, 20b are formed in the inlet side sloping surface 15. These inlet ports 20a, 20b are aligned along the pentroof apex portion $A_0$. A pair of exhaust ports 21a, 21b are formed in the exhaust side sloping surface 16. The exhaust ports 21a, 21b are also aligned along the pentroof apex portion $A_0$. Valve seat members 22, 23 (shown in FIG. 2) are cast on inner circumferential surfaces of the inlet ports 20a, 20b and the exhaust ports 21a, 21b, respectively. A sparking plug hole 25 is formed in proximity to the inlet ports 20a, 20b. A sparking plug (not shown) is inserted into the sparking plug hole 25.

Figure 3:
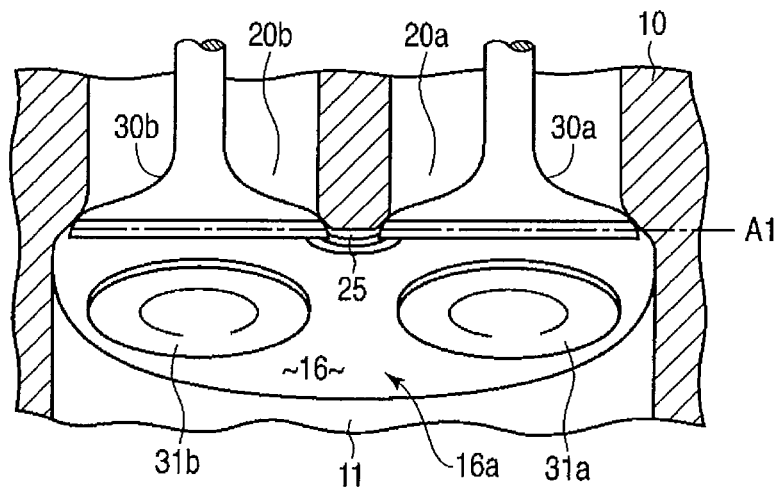
FIG. 3 is a drawing showing a sectional view of the combustion chamber taken along the line F3-F3 in FIG. 1 together with an inlet and exhaust valves.

FIG. 3 is a sectional view of the cylinder head 10 taken along the line F3-F3 in FIG. 1, in which inlet valves 30a, 30b and exhaust valves 31a, 31b are shown. The inlet valves 30a, 30b are driven by a continuous variable valve lift mechanism, not shown. The inlet valves 30a, 30b open and close the inlet ports 20a, 20b, respectively, and can change their opening degrees or lift amounts in accordance with the operating conditions of the engine. The exhaust valves 31a, 31b open and close the exhaust ports 21a, 21b, respectively.

A shroud portion 40 is formed on the inlet side sloping surface 15 on a side lying farther away from the exhaust ports 21a, 21b. The shroud portion 40 is formed between the inlet ports 20a, 20b and projects like a bank towards an inside of the combustion chamber 11. A surface 40a of the shroud portion 40 is flat and constitutes part of the inlet side sloping surface 15.

An inlet air/fuel mixture flow improving machined portion 50 (an flow improving portion) is formed between the inlet ports 20a, 20b and the exhaust ports 21a, 21b on an opposite side to the shroud portion 40 which is a side near to the exhaust ports 21a, 21b, in the combustion chamber 11. As will be described below, this inlet air/fuel mixture flow improving machined portion 50 is a shallow recess portion which faces the combustion chamber 11 and is formed from the inlet side sloping surface 16 to an exhaust surface 53 which constitutes part of the exhaust side sloping surface 16.

Figure 4:
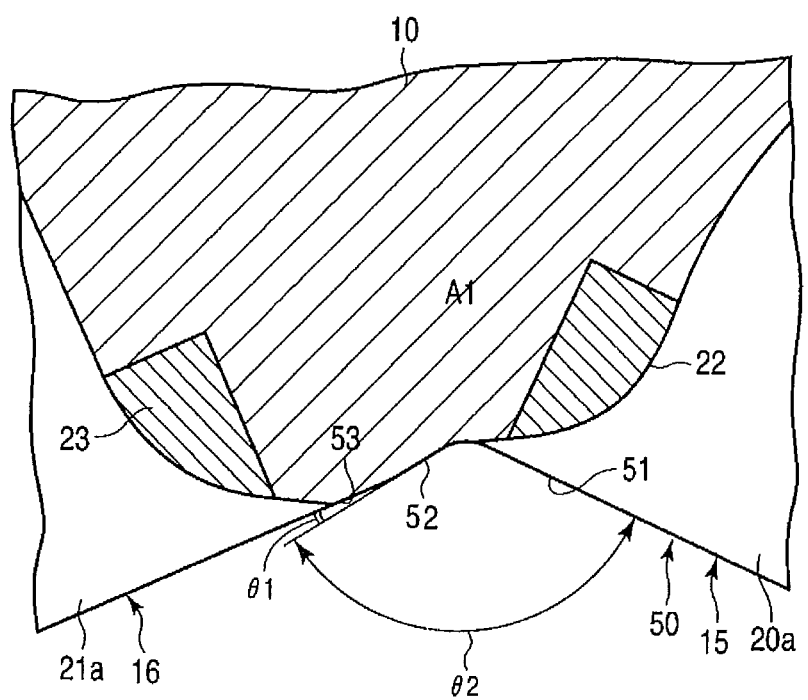
FIG. 4 is a sectional view of the combustion chamber taken along the line F4-F4 in FIG. 1.
Figure 5:
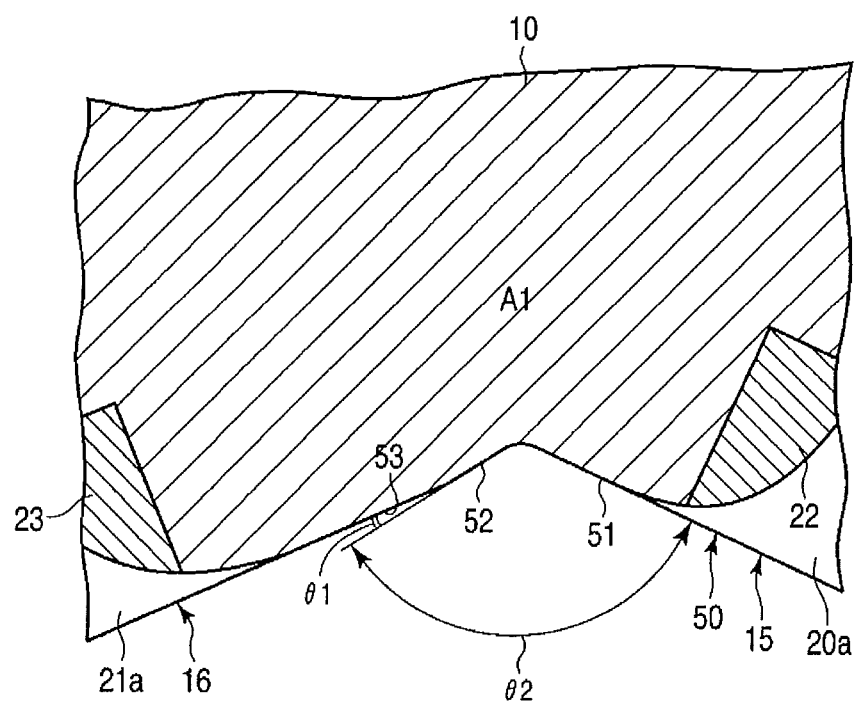
FIG. 5 is a sectional view of the combustion chamber taken along the line F5-F5 in FIG. 1.

FIG. 4 is an enlarged sectional view taken along the line F4-F4 in FIG. 1 and showing a portion lying near the inlet air-fuel mixture flow improving machined portion 50. FIG. 5 is an enlarged sectional view taken along the line F5-F5 shown in FIG. 1 and showing the portion lying near the inlet air/fuel mixture flow improving machined portion 50. The inlet air/fuel mixture flow improving machined portion 50 has an inlet air/fuel mixture flow surface 51 (an inlet flow surface) which is formed on a side of an apex portion A1, as a boundary, of the inlet air/fuel mixture flow improving machined portion 50, the side constituting the same side as the side where the inlet side sloping surface 15 is formed and an exhaust side guide surface 52 which is formed on an opposite side (the same side as the side where the exhaust side sloping surface 16 is formed) of the apex portion A1, as the boundary, of the inlet air/fuel mixture flow improving machined portion 50 to the side where the inlet air/fuel mixture flow surface 51 is formed.

The inlet air/fuel mixture flow surface 51 is formed by recessing part of the inlet side sloping surface 15 and has a flat plane shape. The exhaust side guide surface 52, which continues to the inlet air/fuel mixture flow surface 51, extends along the apex portion A1 of the inlet air/fuel mixture flow improving machined portion 50 in the direction in which the inlet ports 20a, 20b are aligned with a constant width W (shown in FIGS. 1 and 2) held along the full length thereof. This exhaust side guide surface 52 is formed so that an angle formed by the inlet air/fuel mixture flow surface 51 and itself is smaller than an angle formed by the exhaust surface 53 and itself. Consequently, the exhaust side guide surface 52 continues to the exhaust surface 53 with a small angle θ1 formed therebetween. The angle θ1 is 0 to 10 degrees, for example.

In FIGS. 4 and 5, an angle θ2 formed by the inlet air/fuel mixture flow surface 51 and the exhaust side guide surface 52 is depicted. The angle θ2 formed by the inlet air/fuel mixture flow surface 51 and the exhaust side guide surface 52 is smaller than or equal to an angle (θ1+θ2) formed by the exhaust surface 53 and the inlet flow surface 51. This angle θ2 is constant at portions of the inlet air/fuel mixture flow improving machined portion 50 lying along the apex portion a1 of the inlet air/fuel mixture flow improving machined portion 50. A stepped portion 55 is formed between the inlet air/fuel mixture flow surface 51 and the shroud portion 40 and on a straight line which connects centers of the inlet ports 20a, 20b. This stepped portion 55 is inclined at an angle θ3 with respect to the inlet air/fuel mixture flow surface 51.

Figure 6:
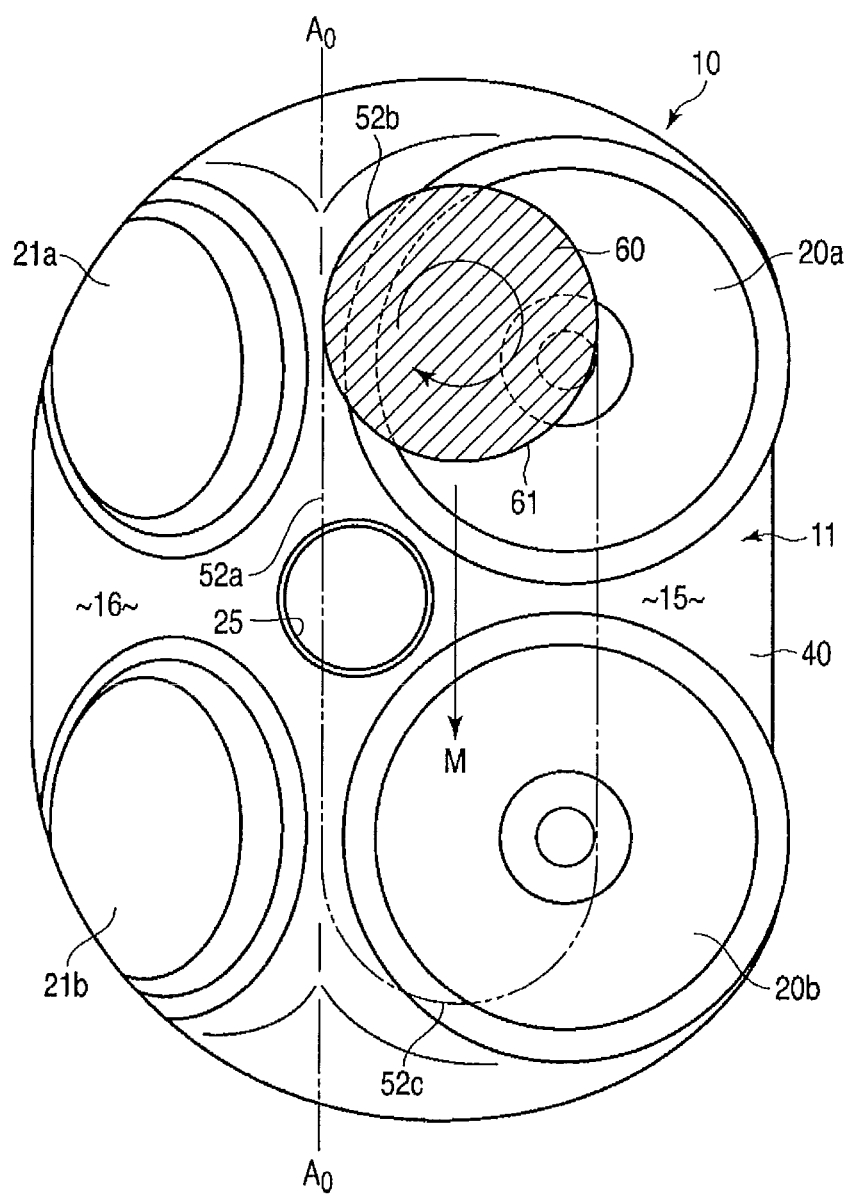
FIG. 6 is a drawing showing a state before machining an inlet air/fuel mixture flow improving machined portion in the combustion chamber shown in FIG. 1 together with rotary cutting tool.
Figure 7:
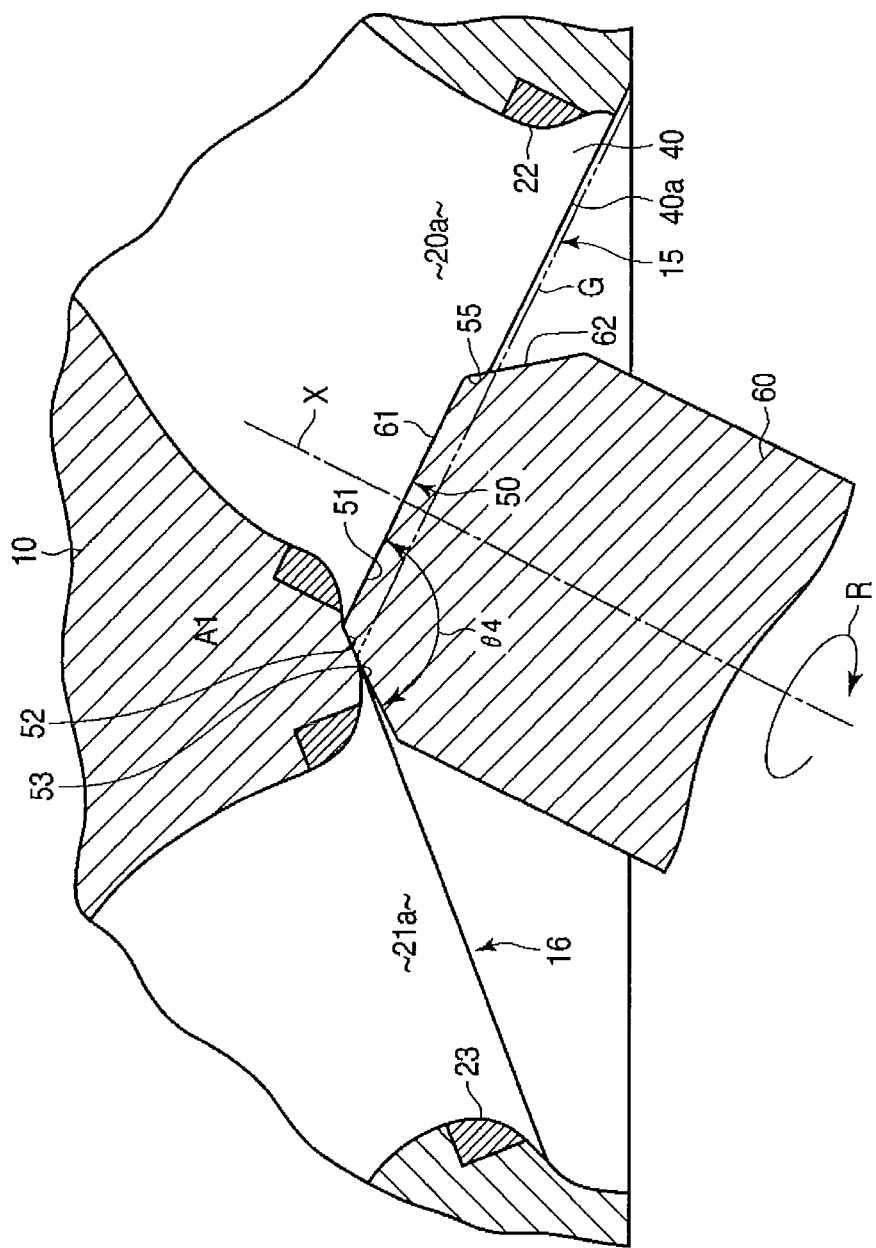
FIG. 7 is a sectional view showing part of the combustion chamber shown in FIG. 6 together with the rotary cutting tool.

The inlet air/fuel mixture flow improving machined portion 50 is machined by a rotary cutting tool 60 shown in FIGS. 6 and 7. The inlet air/fuel mixture flow improving machined portion 50 is formed so as to be slightly recessed from the surface of the material, which is the cast texture, by being machined by the rotary cutting tool 60.

The rotary cutting tool 60 is rotated in a direction indicated by an arrow R about an axis X by a machine tool such as a machining center, not shown. An example of a rotary cutting tool 60 is a forming milling cutter having an end blade 61 and a circumferential blade 62. An angle θ4 (shown in FIG. 7) formed by the end blade 61 and the circumferential blade 62 is equal to the angle θ2 of the exhaust side guide surface 52 and the angle θ3 of the stepped portion 55.

The inlet side sloping surface 51 is cut by the end blade 61 of the rotary cutting tool 60 so that the inlet air/fuel mixture flow surface 51 is formed, and the exhaust side guide surface 52 and the stepped portion 55 are cut to be formed by the circumferential blade 62. A chain double-dashed line G in FIG. 7 indicates a position where the surface of the material, which is the cast texture, is situated before machining.

As is shown in FIG. 6, the rotary cutting tool 60 is rotated to start machining from the side of the inlet port 20a, and the rotary cutting tool 60 is translated in a direction indicated by an arrow M towards the other inlet port 20b. By so doing, the inlet air/fuel mixture flow surface 51 is formed in the inlet side sloping surface 15 by the end blade 61 of the rotary cutting tool 60, and the exhaust side guide surface 52 and the stepped portion 55 are cut simultaneously by the circumferential blade 62. Further, the apex portion A1 of the inlet air/fuel mixture flow improving machined portion is cut at a point of intersection between the end blade 61 and the circumferential blade 62.

By the machining employing the rotary cutting tool 60, the exhaust side guide surface 52 and the stepped portion 55 become laterally symmetrical with each other across a widthwise center C (shown in FIG. 2) of the inlet air/fuel mixture flow surface 51 as a symmetrical axis, and moreover, the angle θ2 formed by the exhaust side guide surface 52 with respect to the inlet air/fuel mixture flow surface 51 coincide with the angle θ3 formed by the stepped portion 55 with respect to the inlet air/fuel mixture flow surface 51. In other words, an angle between the stepped portion 55 and the inlet air/fuel mixture flow surface 51 is equal to an angle between the inlet air/fuel mixture flow surface 51 and the exhaust side guide surface 52.

In FIG. 1 in which the combustion chamber 11 is viewed from the inside thereof, the exhaust side guide surface 52, which constitutes part of the inlet air/fuel mixture flow improving machined portion 50, has a straight-line portion 52a which extends along the apex portion A1 of the inlet air/fuel mixture flow improving machined portion 50 and arc portions 52b, 52c which are formed at both ends of the straight-line portion 52a. The straight-line portion 52a extends in the direction in which the pair of inlet ports 20a, 20b are aligned.

The arc portion 52b, which is one of the arc portions of the exhaust side guide surface 52, is positioned between the inlet port 20a, which is one of the inlet ports 20a, 20b, and the exhaust port 21a, which is one of the exhaust ports 21a, 21b. The other arc portion 52c is positioned between the other inlet port 20b and the other exhaust port 21b. Since these arc portions 52b, 52c are machined by the circumferential blade 62 of the rotary cutting tool 60, a radius of curvature of the arc portions 52b, 52c corresponds to a radius of the circumferential blade 62.

In addition, since the surface 40a of the shroud portion 40 is flat, the surface 40a can be machined by a normal end mill having only an end blade. Although the surface 40a of the shroud portion 40 may be machined before or after the inlet air/fuel mixture flow improving machined portion 50 is machined, in either of the cases, in order to facilitate the deburring of burrs produced by the machining, the order of machining the shroud portion 40 and machining the inlet air/fuel mixture flow improving machined portion is selected.

According to the combustion chamber 11 of this embodiment, the inlet air/fuel mixture flow improving machined portion 50 having the inlet air/fuel mixture flow surface 51 and the exhaust side guide surface 52 is formed between the inlet ports 20a, 20b and the exhaust ports 21a, 21b. The exhaust side guide surface 52 continues to the inlet air/fuel mixture flow surface 51 with the predetermined angle θ2 formed therebetween, and the exhaust surface 53 continues to the exhaust side guide surface 52 with the small angle θ1 formed therebetween. Because of this, the flow of inlet air/fuel mixture which flows into the combustion chamber 11 form the inlet ports 20a, 20b can flow stably in the combustion chamber 11 along the inlet air/fuel mixture flow surface 51, as well as the exhaust side guide surface 52 and the exhaust surface 53. In addition, the angle θ1 may be 0 degree.

In this embodiment, since the inlet air/fuel mixture flow improving machined portion 50 is machined by the rotary cutting tool 60, even though the height of the surface (the cast texture) of the material varies, the angle θ2 formed by the inlet air/fuel mixture flow surface 51 and the exhaust side guide surface 51 can be made constant at the portions lying in the direction along the apex portion A1 of the inlet air/fuel mixture flow improving machined portion 50 (the direction along which the rotary cutting tool 60 travels). Moreover, the angle θ2 of the exhaust side guide surface 52 and the angle θ3 of the stepped portion 55 individually coincide with the angle θ4 formed by the end blade 61 and the circumferential blade 62 of the rotary cutting tool 60. In addition, the angle θ1 formed by the exhaust side guide surface 52 and the exhaust surface 53 becomes almost constant at the portions along the apex portion A1 of the inlet air/fuel mixture flow improving machined portion 50.

Figure 11:
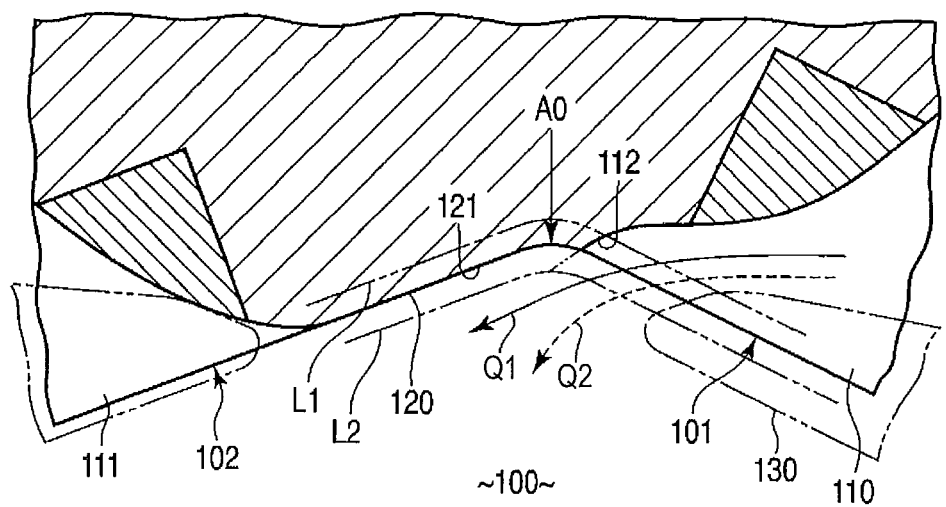
FIG. 11 is a sectional view showing part of a conventional combustion chamber.

According to the combustion chamber construction of the embodiment that is configured as has been described heretofore, variation in the flow of inlet air/fuel mixture can be avoided which is attributed to variation in height of the surface of the material as occurring in the conventional combustion chamber such as the combustion chamber having the guide portion 121 shown in FIG. 11 for example.

Figure 8:
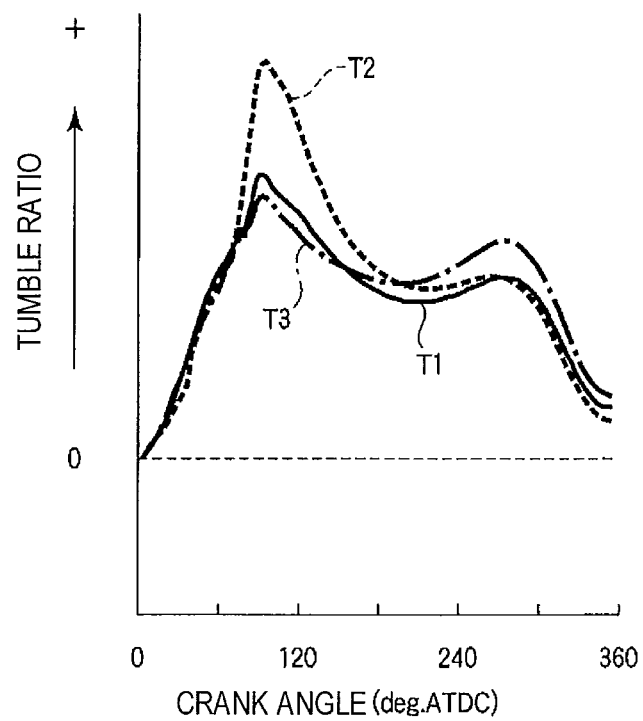
FIG. 8 is a drawing showing a relationship between a crank angle and a tumble ratio of an engine having the combustion chamber shown in FIG. 1.

FIG. 8 shows a relationship between a crank angle and a tumble ratio of an engine having the combustion chamber construction (FIG. 1) of the embodiment. "ATDC" is an abbreviation for after top dead center. A solid line T1 in FIG. 8 indicates a tumble ratio when the surface of the material is situated in a reference position. A broken line T2 indicates a tumble ratio when the surface of the material deviates towards a lower side. An alternate long and short dash line T3 indicates a tumble ratio when the surface of the material deviates towards an upper side. Even though the surface of the material deviates, the deviation of the tumble ratio remains in a small range.

Figure 9:
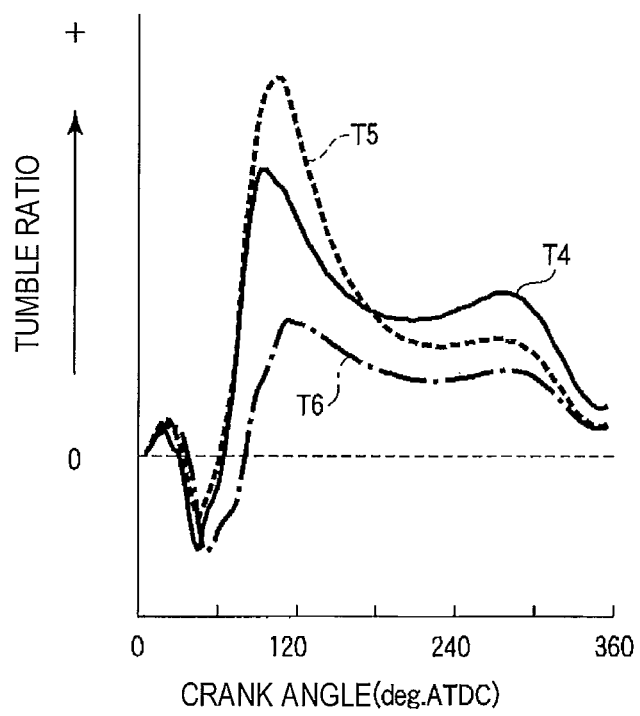
FIG. 9 is a drawing showing a relationship between a crank angle and a tumble ratio of an engine having a combustion chamber of Comparison Example 1.

FIG. 9 shows a relationship between a crank angle and a tumble ratio of an engine having combustion chamber construction of Comparison Example 1. In the combustion chamber construction of Comparison Example 1, a shroud which is a projecting flow promoting portion is formed at part of a combustion chamber on a side lying farther from an exhaust port. A solid line T4 in FIG. 9 indicates a tumble ratio when the surface of a material is situated in a reference position, a broken line T5 indicates a tumble ratio when the surface of the material deviates towards a lower side, and an alternate short and long dash line T6 indicates a tumble ratio when the surface of the material deviates toward an upper side. In Comparison Example 1, variation in the tumble ratio when the surface of the material deviates towards the upper side becomes large.

Figure 10:
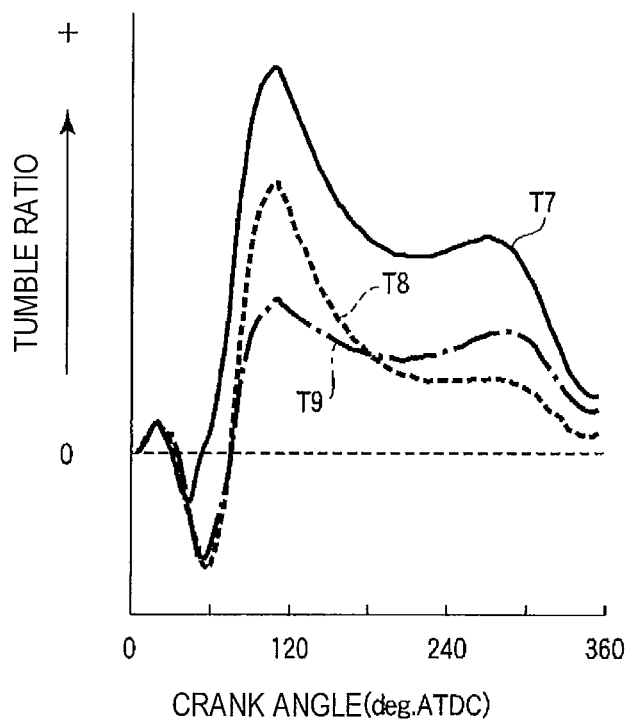
FIG. 10 is a drawing showing a relationship between a crank angle and a tumble ratio of an engine having a combustion chamber of Comparison Example 2.

FIG. 10 shows a relationship between a crank angle and a tumble ratio of an engine having combustion chamber construction of Comparison Example 2. In the combustion chamber construction of Comparison Example 2, the shroud is formed at part of a combustion chamber, and a guide portion made up of a recess portion is formed on an opposite side to the shroud which is a side lying closer to an exhaust port. A solid line T7 in FIG. 10 indicates a tumble ratio when the surface of a material is situated in a reference position, a broken line T8 indicates a tumble ratio when the surface of the material deviates towards a lower side, and an alternate short and long dash line T9 indicates a tumble ratio when the surface of the material deviates toward an upper side. In Comparison Example 2, variation in the tumble ratios when the surface of the material deviates towards the upper side and the lower side becomes large.

In the combustion chamber of the embodiment, without being affected by the variation in casting of the cylinder head 10, the inlet air/fuel mixture flow surface 51 continues to the exhaust side guide surface 52 with the predetermined angle θ2 formed therebetween. Moreover, the exhaust side guide surface 52 can continue to the exhaust surface 53 with the small angle θ1 formed therebetween. Because of this, the flow of inlet air/fuel mixture which flows into the combustion chamber 11 from the inlet ports 20a, 20b can flow stably in the combustion chamber 11 along the inlet air/fuel mixture flow surface, as well as the exhaust side guide surface 52 and the exhaust surface 53, thereby making it possible to produce a desired flow by the tumble flow of inlet air/fuel mixture.

In particular, when the lift amounts of the inlet valves 30a, 30b are small, the inlet air/fuel mixture which flows into the combustion chamber from the inlet ports 20a, 20b is allowed to flow stably along the inlet air/fuel mixture flow surface 51, as well as the exhaust side guide surface 52 and the exhaust surface 53. Moreover, the inlet air/fuel mixture which flows in from the inlet ports 20a, 20b can be directed towards the inlet air/fuel mixture flow surface 51 by the suppressing action of the shroud portion 40. Further, since the stepped portion 55 provided between the inlet air/fuel mixture flow surface 51 and the shroud portion 40 is formed on the straight line which connects the centers of the inlet ports 20a, 20b, only inlet air/fuel mixture which is directed towards the farther side than the inlet air/fuel flow surface 51 from the exhaust ports can be suppressed, whereby the in-cylinder flow can be strengthened without reducing the induction efficiency. Consequently, a strong tumble flow and an in-cylinder flow can be generated within the combustion chamber 11, and the stabilization of combustion is facilitated, thereby making it possible to realize an improvement in exhaust emissions and an increase in fuel consumption by controlling ignition timings and the amount of inlet air minutely.

In addition, since the combustion chamber wall surface is formed by machining, the combustion chamber can be formed with higher accuracy than the accuracy with which a combustion chamber is formed of castings. Consequently, the volume of the combustion chamber becomes stable, and variation in compression ratio can be suppressed. Therefore, the stabilization of combustion is facilitated in this respect. Further, since the induction resistance is reduced, the engine performance can be increased and the quality in performance can be made stable.

According the combustion chamber construction for an engine, the flow of inlet air/fuel mixture which flows into the combustion chamber from the inlet port can be improved by the inlet air/fuel mixture flow improving machined portion having the inlet air/fuel mixture flow surface and the exhaust side guide surface when the lift amount of the inlet valve is small, thereby making it possible to realize a good in-cylinder flow of inlet air/fuel mixture and a strong flow thereof.

In carrying out the invention, needless to say, the invention can be carried out by changing variously the specific modes such as configurations and positions of the portions which make up the combustion chamber such as the inlet air/fuel mixture flow surface of the inlet air/fuel mixture flow improving machined portion and the exhaust side guide surface in addition to the specific configuration of the combustion chamber and the disposition of the inlet ports and the exhaust ports.

What is claimed is:

1. A combustion chamber construction for an engine, the construction comprising:
    an inlet side sloping surface which is formed on one side of a pentroof apex portion as a boundary and which has an inlet port;
    an exhaust side sloping surface which is formed on the other side of the pentroof apex portion as the boundary and which has an exhaust port; and
    a flow improving portion, formed between the inlet port and exhaust port, and including:
        an inlet flow surface which is formed by recessing part of the inlet side sloping surface; and
        an exhaust side guide surface, one end of which is connected to an exhaust surface of the exhaust side sloping surface and the other end of which is connected to the inlet flow surface,
        wherein an angle formed by the inlet flow surface and the exhaust side guide surface is smaller than or equal to an angle formed by the exhaust surface and the inlet flow surface.

2. The combustion chamber construction according to claim 1, wherein
    the angle formed by the inlet flow surface and the exhaust side guide surface is constant along an apex portion of the flow improving portion.

3. The combustion chamber construction according to claim 2, wherein
    a pair of inlet ports are formed in the inlet side sloping surface, and
    the apex portion of the flow improving portion and the exhaust side guide surface extend along a direction in which the pair of the inlet ports are aligned.

4. The combustion chamber construction according to claim 3, wherein
    a shape of the exhaust side guide surface has a straight-line portion which extends along the direction in which the pair of the inlet ports are aligned and arc portions which are formed at both ends of the straight-line portion.

5. The combustion chamber construction according to claim 4, further comprising:
    a shroud portion, formed on a side which lies farther from the exhaust port than the inlet flow surface of the inlet side sloping surface, and projected to an inside of the combustion chamber; and a stepped portion, formed between the shroud portion and the inlet flow surface, and formed between the pair of the inlet ports.

6. The combustion chamber construction according to claim 5, wherein
the stepped portion is formed on a straight line which connects centers of the pair of the inlet ports.

7. The combustion chamber construction according to claim 1, further comprising:
a shroud portion, formed on a side which lies farther from the exhaust port than the inlet flow surface of the inlet side sloping surface, and projected to an inside of the combustion chamber; and
a stepped portion formed between the shroud portion and the inlet flow surface, and inclined with respect to the inlet flow surface,
wherein an angle between the stepped portion and the inlet flow surface is equal to an angle between the inlet flow surface and the exhaust side guide surface.

8. The combustion chamber construction according to claim 7, wherein
a pair of inlet ports are formed in the inlet side sloping surface, and
the stepped portion is formed on a straight line which connects centers of the pair of the inlet ports.

* * * * *